United States Patent
Angadjivand et al.

(10) Patent No.: US 9,216,306 B2
(45) Date of Patent: Dec. 22, 2015

(54) FILTER ELEMENT THAT HAS PLENUM CONTAINING BONDED CONTINUOUS FILAMENTS

(75) Inventors: Seyed A. Angadjivand, Woodbury, MN (US); Philip G. Martin, Forest Lake, MN (US); David B. Running, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1374 days.

(21) Appl. No.: 11/275,300

(22) Filed: Dec. 22, 2005

(65) Prior Publication Data
US 2007/0144123 A1      Jun. 28, 2007

(51) Int. Cl.
| B01D 39/00 | (2006.01) |
| A62B 23/02 | (2006.01) |
| A62B 23/00 | (2006.01) |
| B01D 46/10 | (2006.01) |
| B01D 39/16 | (2006.01) |

(52) U.S. Cl.
CPC ............... *A62B 23/02* (2013.01); *A62B 23/00* (2013.01); *B01D 39/1623* (2013.01); *B01D 46/10* (2013.01); *B01D 2275/10* (2013.01)

(58) Field of Classification Search
CPC .... A62B 23/00; A62B 23/02; B01D 2275/10; B01D 39/1623; B01D 46/10
USPC ............ 55/486, 482, DIG. 44, 527, 528; 128/863, 206.12
See application file for complete search history.

(56) References Cited

U.S. PATENT DOCUMENTS

| 2,206,061 A | 7/1940 | Splaine |
| 2,220,374 A | 11/1940 | Lewis |
| 2,295,119 A | 9/1942 | Malcom et al. |
| 2,320,770 A | 6/1943 | Cover |
| 3,032,569 A * | 5/1962 | Freeman, Jr. ........... C07C 17/00 534/11 |
| 3,352,778 A * | 11/1967 | Brink, Jr. et al. ............. 516/136 |
| 3,686,049 A | 8/1972 | Manner et al. |
| 3,691,004 A | 9/1972 | Werner et al. |
| 3,705,070 A * | 12/1972 | Kim .............................. 428/112 |

(Continued)

FOREIGN PATENT DOCUMENTS

| CA | 1265754 | 2/1990 |
| EP | 0 582 007 B1 | 2/1996 |

(Continued)

OTHER PUBLICATIONS

Kamath et al. "Thermal Bonding of Nonwoven Fabrics," from the University of Tennessee <http://www.engr.utk.edu/mse/pages/Textiles/Thermal%20Bonding.htm> Apr. 2004.*

(Continued)

*Primary Examiner* — Jason M Greene
*Assistant Examiner* — Anthony Shumate
(74) *Attorney, Agent, or Firm* — Karl G. Hanson

(57) ABSTRACT

A filter element 12 that includes a fluid inlet 16, a fluid outlet 17 that is in fluid communication with the inlet 16, a filter media 40, 42 through which the fluid passes when moving from the inlet 16 to the outlet 17, and a plenum 38 that comprises continuous filaments 66 that are bonded to each other at points of filament intersection 68. The plenum is easy to manufacture, is resistant to compaction when contorted, and exhibits a low pressure drop as air is distributed across the filter media.

24 Claims, 4 Drawing Sheets

(56) References Cited

U.S. PATENT DOCUMENTS

| | | |
|---|---|---|
| 3,757,496 A | 9/1973 | Berg |
| 3,837,988 A | 9/1974 | Hennen et al. |
| 4,059,528 A | 11/1977 | Grosshandler |
| 4,215,682 A * | 8/1980 | Kubik et al. ............. 128/205.29 |
| 4,220,150 A | 9/1980 | King |
| 4,227,350 A | 10/1980 | Fitzer |
| 4,270,935 A | 6/1981 | Reinauer |
| 4,351,683 A | 9/1982 | Kusilek |
| 4,501,272 A | 2/1985 | Shigematsu et al. |
| 4,603,618 A | 8/1986 | Soltis |
| 4,634,485 A | 1/1987 | Welygan et al. |
| 4,886,058 A | 12/1989 | Brostrom et al. |
| 4,913,757 A | 4/1990 | Yamanaka et al. |
| 5,038,775 A | 8/1991 | Maruscak et al. |
| 5,040,528 A | 8/1991 | O'Neill |
| 5,156,738 A | 10/1992 | Maxson |
| 5,244,482 A * | 9/1993 | Hassenboehler, Jr. ....................... B01D 39/163 55/528 |
| 5,427,092 A | 6/1995 | Shiao |
| 5,436,054 A * | 7/1995 | Tani et al. ............. B01D 39/083 264/DIG. 48 |
| 5,443,606 A * | 8/1995 | Hassenboehler, Jr. ....................... B01D 39/163 55/486 |
| RE35,062 E | 10/1995 | Brostrom et al. |
| 5,507,847 A | 4/1996 | George et al. |
| 5,599,366 A * | 2/1997 | Hassenboehler, Jr. ....................... B01D 39/163 55/486 |
| 5,603,753 A | 2/1997 | Krull et al. |
| 5,656,368 A | 8/1997 | Braun et al. |
| 5,733,825 A * | 3/1998 | Martin et al. ................. 442/361 |
| 5,811,186 A | 9/1998 | Martin et al. |
| 5,906,735 A | 5/1999 | O'Rourke |
| 5,917,066 A | 6/1999 | Eisenmann et al. |
| 5,992,214 A | 11/1999 | Tayebi et al. |
| 6,055,983 A | 5/2000 | Metzger |
| 6,312,609 B1 | 11/2001 | Solyanik et al. |
| 6,680,028 B1 | 1/2004 | Harris |
| 6,761,162 B1 | 7/2004 | Swann |
| 6,874,499 B2 | 4/2005 | Viner et al. |
| 8,206,484 B2 * | 6/2012 | Claasen ............... D01D 5/0985 210/500.27 |
| 2003/0003830 A1 * | 1/2003 | Ouederni ................ A16F 13/53 442/327 |
| 2003/0150196 A1 | 8/2003 | Duffy |
| 2003/0183233 A1 | 10/2003 | Chang |
| 2004/0011362 A1 * | 1/2004 | Angadjivand et al. ... 128/206.13 |
| 2004/0074387 A1 | 4/2004 | Jaisinghani |
| 2004/0141835 A1 | 7/2004 | Katayama et al. |
| 2010/0037576 A1 * | 2/2010 | Claasen ............... D01D 5/0985 55/523 |
| 2010/0064647 A1 * | 3/2010 | Brands ................ D01D 5/0023 55/528 |

FOREIGN PATENT DOCUMENTS

| | | |
|---|---|---|
| JP | 8-131719 | 5/1996 |
| WO | WO 03/037440 A1 | 5/2003 |
| WO | WO 2004028662 A2 * | 4/2004 |

OTHER PUBLICATIONS

ASTM D1621—04a "Standard Test Method for Compressive Properties of Rigid Cellular Plastics" May 24, 2010 pp. 5 <http://compass.astm.org/Standards/Historical/D1621-04A.htm>.*

3M "3M™ 6x20 Spacer Web 4430-6X20" p. 1, retrieved Sep. 28, 2015<http://solutions.3m.com/wps/portal/3M/en_US/NA_Communication_Technologies/Home/Products/~/3M-6x20-Spacer-Web-4430-6X20?N=7569728+3294460019&rt=rud>.*

3M "3M™ Better Buried Closures" pp. 4, 2010<http://multimedia.3m.com/mws/media/603800O/better-buried-compound-compression-gravity-fill-closure-lo-res.pdf>.*

ASTM International Designation: D 1621-04a *Standard Test Method for Compressive Properties of Rigid Cellular Plastics*.

Derwent and Japio Abstracts for JP 8-131719.

* cited by examiner

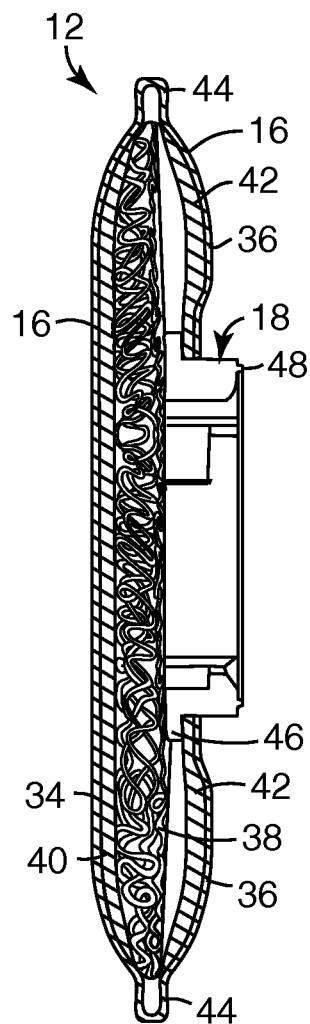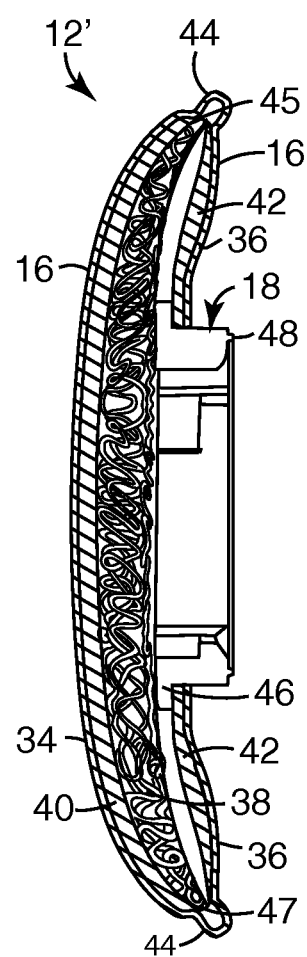
Fig. 2
Fig. 3

FILTER ELEMENT THAT HAS PLENUM CONTAINING BONDED CONTINUOUS FILAMENTS

The present invention pertains to a filter element that uses a new plenum for managing fluid flow across a filter media. The plenum comprises continuous filaments that are bonded to each other at points of filament intersection. The filter element may, for example, take the form of a filter cartridge that is attached to a respirator.

BACKGROUND

Persons who work in contaminated environments commonly wear respirators to protect themselves from inhaling contaminants that are suspended in the surrounding air. The respirators—also referred to as "filtering face masks"—may have a filter element integral to the mask body (see, for example, U.S. Pat. No. 5,307,796 to Kronzer et al.) or separately attachable (see, for example, U.S. Pat. No. 5,579,761 to Yuschak et al.). In either instance, the respirator must comfortably provide the wearer with protection from airborne particles or unpleasant or noxious gases over the useful service life of the filter element. To achieve this goal, the filter element needs to remove the contaminants without early clogging and with minimal effort or energy requirements. Because the wearer commonly supplies the energy needed to draw air through the filter media, less resistance to airflow means that the wearer does not need to work as hard to breathe clean air—hence, a more comfortable mask. This resistance of air-movement through the filter media is commonly referred to as "pressure drop". Lower pressure drops are desired across filters because they allow air to be filtered with greater ease. Wearer comfort is important in respirator design because uncomfortable masks are more likely to be removed from a wearer's face in a contaminated environment. In addition to providing lower pressure drops, the respirator also should fit comfortably on the face without stress to the neck and without obstructing the wearer's field of view.

To achieve appropriate levels of filter performance—such as those defined in 30 C.F.R 11 subpart K §§11.130-11.140-12 (1987), 42C.F.R Part 84 (July 1995), DIN 3181 Part 2, "Atemfilter für Atemschultzgeräte" (March, 1980), BS 2091, "Respirators for Protection Against Harmful Dusts and Gases" (1969), BS 4555, "High Efficiency Dust Respirators" (1969), EN 149 (April 2001)—the number of layers of filter material, filter material type, and available filtration area are important factors in filter element design. Investigators who design new filter element concepts attempt to create products that maximize the available filtration area by properly managing air flow across (and through) the filter media. Proper airflow management can prevent premature loading of the filter material. If the air-to-be-filtered is not uniformly distributed over the filter media during the filtering operation, the filtered particles may become unevenly collected by the filter, resulting in an early shortening of filter service life. Investigators also attempt to design respiratory products that are lightweight and evenly balanced on the wearer's head.

U.S. Pat. RE 35,062 to Brostrom et al. discloses a known lightweight filter element that uses a porous "baffle component" as a plenum to distribute air flow across the available filter element surface area. This filter element is adapted for attachment to a respirator facepiece and includes two layers of filter material that are separated by the baffle component. The '062 patent indicates that the baffle component can be made from woven or nonwoven webs, loose fibers, fiber batts, loose particulate material such as carbon particles, particulate material bonded together in a porous matrix, and combinations of such materials.

Examples of other filter elements are described in the following publications: EP0582007B1, U.S. 2003/0183233A1, U.S. Pat. No. 2,206,061, U.S. Pat. No. 2,220,374, U.S. Pat. No. 2,295,119, U.S. Pat. No. 2,320,770, U.S. Pat. No. 4,270,935, U.S. Pat. No. 4,501,272, U.S. Pat. No. 4,603,618, U.S. Pat. No. 4,886,058, U.S. Pat. No. 5,040,528, U.S. Pat. No. 5,156,738, U.S. Pat. No. 5,917,066, U.S. Pat. No. 6,680,028, and U.S. Pat. No. 6,761,162.

SUMMARY OF THE INVENTION

The present invention provides a new filter element that comprises: (a) a fluid inlet; (b) a fluid outlet in fluid communication with the fluid inlet; (c) filter media through which a fluid passes when moving from the inlet to the outlet; and (d) a plenum that is in fluid communication with the filter medium and that comprises filaments that are bonded to each other at points of filament intersection.

The present invention differs from known filter elements in that the invention includes a plenum that has continuous filaments that are bonded to each other at points of filament intersection. The inventors discovered that the use of such a plenum provides a variety of benefits to the filter element. The plenum enables the filter element to achieve a rapid distribution of fluid flow across the filter media without causing a substantial pressure drop increase. Because continuous filaments are used, which filaments are bonded to each other at points of filament intersection, less filaments may be used volumetric-wise in the construction of the plenum. The use of fewer filaments provides less restriction to fluid flow. And when a fluid moves more freely through the plenum, there is less pressure drop across this portion of the filter element. As indicated above, lower pressure drops are beneficial in that they reduce the energy requirements needed to draw a fluid through the filter element. The need for less energy is particularly advantageous in "negative pressure respirators", which, by definition, use a wearer's lungs as the power source that causes fluid flow through the filter element. Additionally, the inventive plenum is beneficial in that it can be contorted into a variety of configurations without being compressed. Resistance to compression is important for filtration operations because it preserves lateral fluid flow through the plenum and thereby prevents non-uniform fluid distribution patterns and pressure drop increases. Because of its ability to be contorted without substantial compression, the inventive plenum can be intentionally fashioned into a curved configuration that can enable the filter element to, for example, be attached more closely to the respiratory mask to not cause a large downward moment from gravitational force when worn and to remain out of a respirator wearer's field of vision.

These and other advantages of the invention are more fully shown and described in the drawings and detailed description of this invention, where like reference numerals are used to represent similar parts. It is to be understood, however, that the drawings and description are for illustration purposes only and should not be read in a manner that would unduly limit the scope of this invention.

GLOSSARY

The terms set forth below will have the meanings as defined:

"bonded" means contact between two or more filaments that results in a restriction of movement between those filaments relative to each other;

"clean air" means air that has been filtered so that it is safe for a person to inhale;

"compliant face contacting member" means the portion of a mask body that is compliantly fashioned for allowing the mask body to be comfortably supported over a person's nose and mouth;

"contaminants" means a substance that is intended to be removed from the gas or liquid being filtered;

"continuous" means the filaments are not cut to a desired length;

"exterior gas space" means the ambient atmospheric gas space that surrounds a mask body when worn on a person and that ultimately receives exhaled gas after it exits the interior gas space of a mask;

"filter media" means a material, or a combination of materials, that are able to remove contaminants from a fluid that passes therethrough;

"fluid communication component" means an element that is structured to allow a fluid to pass from an interior gas space to an exterior gas space or vice versa;

"fluid inlet" means an area or portion of the filter element through which fluid can enter;

"fluid outlet" means an area or portion of the filter element through which fluid can exit;

"harness" means an element or combination of elements or parts, which elements or combination, allows a mask body to be supported at least over a wearer's nose and mouth;

"interior gas space" means the space that exists between a mask body and a person's face when the mask is being worn;

"mask body" means a structure that can fit at least over the nose and mouth of a person and that can help define an interior gas space separated from an exterior gas space;

"non-integral" means the parts are readily identifiable as separate parts by exterior visual examination and that they are separately made before being joined together;

"plenum" means a part or a combination of parts that is/are capable of distributing or managing fluid flow over a surface of a filter media; and "respirator" means a device that is worn at least over the nose and mouth of a person and that includes at least one filter element for providing clean air for the wearer to breathe.

BRIEF DESCRIPTION OF THE DRAWINGS

In the accompanying drawings:

FIG. 2 is a cross-section of a filter element 12 in accordance with the present invention;

FIG. 3 is a cross-section of a second embodiment of a filter element 12' in accordance with the present invention;

DETAILED DESCRIPTION OF THE PREFERRED EMBODIMENTS

In describing preferred embodiments of the invention, specific terminology is used for the sake of clarity. The invention, however, is not intended to be limited to the specific terms so selected, and each term so selected includes all technical equivalents that operate similarly.

In the practice of the present invention, a new filter element is provided that has a plenum that comprises continuous filaments that are bonded to each other at points of filament intersection. The filter element can have one or more fluid inlets, one or more fluid outlets, and one or more layers of filter media through which the fluid passes when moving from the inlet(s) to the outlet(s). The filter element may be fashioned non-integrally such that it is capable of being separately attached to the mask body exterior such that it may be integrally disposed within the mask body.

Figure 1:
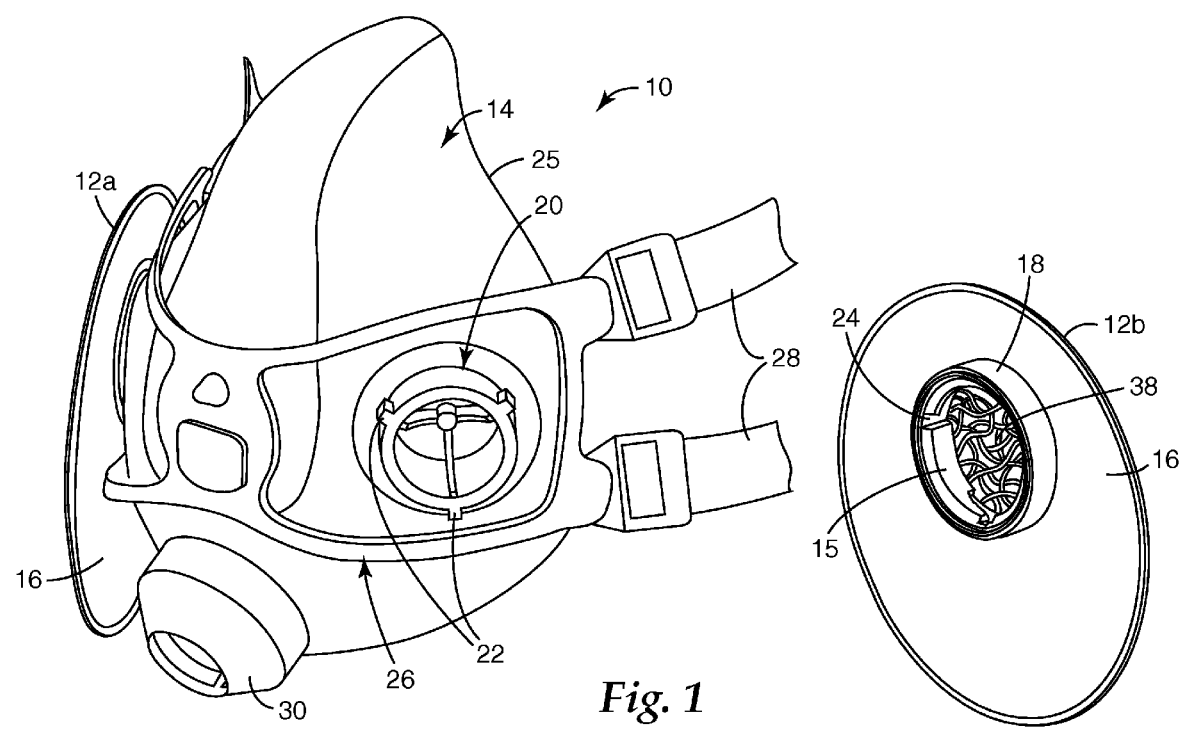
FIG. 1 is a perspective view of a half-mask respirator 10 in accordance with the present invention, showing a first filter element 12a that is joined to the mask body 14 and another filter element 12b that is separated from the mask body 14.

FIG. 1 shows a respiratory mask 10 that has first and second filter elements 12a and 12b located on opposing sides of a mask body 14 exterior. The filter elements 12a and 12b may be removably or permanently attached to the mask body 14. The filter elements 12a, 12b include a fluid inlets 16 through which air may enter the filter element interior. The fluid inlet 16 is a porous outer covering through which air-to-be-filtered passes when a wearer of the mask 10 inhales. Since the filter elements 12a, 12b have the same construction, for ease of discussion, the filter elements 12a, 12b will be referred to simply using numeral "12" when referring to their general construction.

The filter element 12 also has a fluid outlet 15, which is in the form of an orifice that is defined by the interior walls of a breather tube 18. A male bayonet fitting 20 can be provided on mask body 14 for securing the filter element 12 thereto. The bayonet fitting 20 may include a plurality of spaced protuberances 22 that mate with channels 24 in the breather tube 18. The filter element 12 can be attached to the bayonet fitting 20 by inserting the protuberances 22 in the corresponding channels 24 and rotating the filter element 12 in the appropriate direction. Replacement of the filter element 12 can be accomplished by rotating the filter element or mask body in the opposite direction relative to each other. A more detailed description of a bayonet-type fitting that is suitable for use in connection with the present invention is described, for example, in U.S. Pat. No. 5,720,281 to Allen et al. Other suitable filter element attachment mechanisms are described in U.S. Pat. No. 5,062,421 to Burns and Reischel, U.S. Pat. No. 6,277,178 to Holmquist-Brown et al., patent application Ser. No. 10/719,959 (publication number 2005/0109343A1) to Flannigan, and patent application Ser. No. 10/977,076 (publication number 2006/0090754) to Mittelstadt.

As further shown in FIG. 1, the mask body 14 includes a compliant face contacting member 25 and a harness 26. The face contacting member 25 conforms to the wearer's face when pressed against it. The harness 26 can be attached to the mask body 14 so that the respirator 10 can be supported on (and drawn to) the wearer's face. The harness 26 may include one or more straps 28 that pass behind (or over) the wearer's head when the respirator is donned. The straps 28 may be adjustable and/or elastic so that the mask body 14 can be snugly positioned on a variety of head sizes. The harness 26 also could include a crown member (see, for example, U.S. Pat. No. 6,591,837 to Byram) to help support the respirator 10 on a person's face. Examples of harnesses that could be used in conjunction with a personal respiratory protection device of the present invention include those described in U.S. Pat. Nos. 6,715,490, and 6,119,692 to Byram et al., and in U.S. Pat. Nos. 6,732,733 and 6,457,473 to Brostrom et al. An exhalation valve 30 also may be provided on the mask body 14 to enable exhaled air to be purged from the mask interior. Examples of suitable exhalation valves are described in U.S. Patent application Ser. No. 11/041,044, now published U.S. Patent Application 2005/0155607 to Martin et al., and U.S. Pat. No. 6,883,518 to Mittelstadt et al., U.S. Pat. No. 6,854, 463 to Japuntich et al., and RE37,974 to Bowers. These exhalation valves all include a flexible flap that dynamically opens in response to exhaled air.

Air that is inhaled by the wearer passes, in sequence, through the fluid inlet 16, the filter media 40, 42 (FIG. 2), and then the outlet 15. The filtered air then enters the interior gas space of the mask body 14 as clean air that the respirator wearer may safely inhale. Air that is subsequently exhaled by the wearer also enters the interior gas space where it is then purged from the mask interior through an exhalation valve 30 to enter the exterior gas space. Respirator wearers can perform fit testing to ascertain whether the mask properly fits the wearer—see U.S. Pat. No. 6,955,170 to Mullins et al.—so that only clean and exhaled air can enter the interior gas space breathing zone.

Although the invention has been illustrated as a half mask that has first and second filter elements or cartridges, the respiratory mask may come in other forms. For example, the mask could have a single filter cartridge, centrally mounted as shown, for example, in U.S. Pat. No. 6,277,178 to Holmquist-Brown, U.S. Pat. No. 6,216,693 to Rekow et al., or U.S. Pat. No. 5,579,761 to Yuschak et al. The respirator also could be a full face respirator, examples of which are disclosed in U.S. Pat. No. 5,924,420 to Reischel et al. and published U.S. Patent Application 2005/0103335 to Fabin. Additionally, the invention could be used in connection with a powered-air supply source, which would have an air supply hose attached to the mask body rather than filter cartridge(s)—see, for example, U.S. Pat. No. 6,796,304 to Odell et al. and U.S. Pat. No. 6,575,165 to Cook et al. In this instance, the filter element would be disposed in a cartridge worn by the wearer, typically around the waist, and the mask body would be in fluidic communication therewith through the air supply hose. Air can be forced through the filter media by a powered air supply source that may include a fan and an electric motor. Further, the respirator also can be in the form of an escape hood—see U.S. Pat. No. D480,476 to Martinson et al., and U.S. Pat. Nos. 6,302,103, 6,371,116, and 6,701,925 to Resnick.

FIG. 2 shows that the illustrated filter element 12 comprises a front wall 34, a rear wall 36, and a plenum 38 that is disposed between (or contained within) the front and rear walls 34, 36 to more evenly distribute air flow between filter media layers 40 and 42. The front wall 34, rear wall 36, and plenum 38 are substantially coextensive with each other. Both the front and rear walls 34, 36 are fluid permeable and function as the fluid inlet(s). Both walls 34, 36 also are made of a "non-rigid" or flexible material. Because the plenum is resistant to compression, it is particularly beneficial for use in a filter element that has non-rigid sidewalls. The filter element 12 can have various shapes such as round, triangular, rectangular, trapezoidal, oval, elliptical, or otherwise, but typically is circular or generally rectangular when viewed from the front. When viewed from the side, the filter element preferably is curved as discussed below in reference to FIG. 3.

Filter element size can vary depending upon the construction materials selected for the filter element 12 and upon various design and performance criteria known to those skilled in the art, for example, the desired pressure drop across the filter, and the type and amount of dust, mist, or fumes to be removed from the air in the exterior gas space. The shape and size of a filter element, however, preferably is fashioned to not obstruct the wearer's eyesight when mounted on the respirator face piece. The front and rear walls 34, 36 can be joined along their peripheral edges by a number of bonding methods such as thermomechanical methods (for example, ultrasonic welding), sewing, and adhesive bonding such that a bond 44 is formed that prevents the air leakage into or out of the filter element 12 at its periphery. The plenum 38 may also be joined to the front and rear walls 34, 36 through the bond 44.

The filter element 12 has a breather tube 18 that can have various shapes or configurations and can be formed from various materials such as synthetic resin or rubber. The breather tube 18 can be made from a synthetic resin that is heat sealable, for example, polypropylene, and is cylindrical in shape. The breather tube 18 can be mounted essentially anywhere along the interior or exterior surface of the rear wall 36 but preferably is mounted in a central location on the interior surface of the rear wall 36. The breather tube 18 may be mounted to the chosen wall surface using any suitable means such as adhesive or ultrasonic welding. The rear wall 36 is provided with an opening therein to fit to the breather tube 18. The breather tube 18 is bonded to the rear wall 36 to prevent air leakage into or out of the filter element. That is, air cannot enter the interior gas space of respirator 10 without passing through the filter material 40, 42 when the mask is properly fitted to the wearer's face. The breather tube 18 can have a flange 46 on its end that engages the body of the filter element. The flange 46 is juxtapositioned within the interior surface of the rear wall 36. This flange 46 provides a convenient surface for bonding to the interior surface of the rear wall 36, either directly or through filter layer 42. The other mating end 48 of the breather tube 18 can be adapted to either abut directly to a surface 20 on the respirator face piece 14 (FIG. 1) or to engage a gasket disposed between surface 20 on the respirator face piece 14 and the end surface 48 on the breather tube. The breather tube 18 is typically about 1.0 to 4.0 cm in diameter, and more typically about 1.5 to 3.5 cm. Optionally, a speech transmission adaptor could be used in connection with the breather tube 18 and the filter element 12 to allow speech to be better transmitted through the respirator when worn—see U.S. Pat. No. 6,382,206 to Palazzotto et al. The breather tube 18 also may optionally include an inhalation valve, typically a diaphragm valve that allows the wearer to draw filtered air out of the filter element into the interior gas space but prevents the wearer's exhaled air from entering the filter element during an exhalation, thereby directing exhaled air out of the interior gas space through the exhalation valve 30 (FIG. 1). Typically, the optional inhalation valve is part of the respirator face piece. For examples of inhalation valves, see U.S. Pat. No. 6,883,518 to Mittelstadt et al, published U.S. Patent Application 2004/0255947 to Martin et al, and U.S. Pat. No. 4,989,598 to Berg et al.

FIG. 2 shows that the plenum and filter element can exhibit a linear configuration in cross-section. Because of its ability to be contorted without substantial compression, the filter element may take on other configurations.

FIG. 3 shows how the plenum 38 can be contorted when the filter element 12 is curved from a first end (or segment of the periphery) 45 to a second end (or segment of the periphery) 47. As shown, the curve can be a constant, inflection-free curve that would enable the filter element 12' to more closely match the outer contour of the mask body 14 (FIG. 1). The plenum 12', however, could also be contorted to have one or more inflections from the first end 45 to the second end 47 if a more complex curvature is needed to match the mask body. When the filter element resides closer to the mask body, gravity does not exert as great a moment on the mask when worn. The filter elements or cartridges also reside out of the wearer's field of vision.

The outer front and rear walls of the filter element can be comprised of material that can function as filter material. The front and rear walls 34, 36 may take the form of cover webs that may be made from any woven or nonwoven material such as spunbonded web, thermally bonded webs (for example, air-laid or carded), or resin-bonded webs. Typically, the cover webs are made of spun-bonded or carded, thermally bonded webs that have high hydrophobicity such as those made of polyolefins, such as, polypropylene. The cover webs protect and contain the filter material 40, 42, and may serve as an upstream prefilter layer. The selection of construction materials for the front and rear walls 34, 36 may depend upon design factors known to those skilled in the art, such as the type of environment in which a respirator is expected to be used, and performance requirements such as pressure drop, the type and amount of dust, mist, or fume to be removed from the air in the exterior gas space. While the front and rear walls of the filter element may each be comprised of only a single layer of filter or cover web material, a plurality of layers may be used for added performance. The fluid inlet also could be in the form of a porous plastic scrim or openwork grate that extends across a face of the filter element. The porous scrim or openwork grate may be attached to the fluid-impermeable sidewalls of a filter cartridge. The fluid permeable scrim or grate may be provided on the front face of the filter cartridge to protect the filter media and secure the contents of the filter cartridge. The cartridge cover may have multiple openings located therein to allow air from the exterior gas space to be easily drawn through the cover so that it can be filtered by the filter element during an inhalation. The opposing side of the cartridge may possess an outlet and an attachment means for attaching the cartridge to the mask body—for example, U.S. Pat. No. 5,062,421 to Burns and Reischel and U.S. Pat. No. 6,874,499 to Viner et al. The housing of the filter cartridge can be rigid to contain larger quantities of filter material and/or to protect it from damage. Examples of filter elements that have filter media contained within a housing are shown, for example, in U.S. Pat. No. 5,714,126 to Frund, U.S. Pat. No. 4,867,770 to Feeney, and U.S. Pat. No. 4,277,443 to Van der Smissen, et al.

Examples of suitable filter material may include nonwoven web, fibrillated film web, air-laid web, sorbent-particle-loaded fibrous web, glass filter paper, or combinations thereof. The filter material may comprise, for example, polyolefins, polycarbonate, polyesters, polyurethanes, glass, cellulose, carbon, alumina or combinations thereof. Fibrous filter media webs suitable for use in this invention can be made from a variety of techniques, including air laid processes, wet laid processes, hydro-entanglement, spun-bond processes and melt blown processes such as described in Van A. Wente, *Superfine Thermoplastic Fibers*, 48 INDUS. ENGN. CHEM. 1342-46 and in Report No. 4364 of the Naval Research Laboratories, published May 25, 1954, entitled *Manufacture of Super Fine Organic Fibers* by Van A. Wente et al. Webs made using combinations of these techniques and from combinations of such fibers may be used as well. Microfibers, particularly meltblown microfibers, are particularly suitable for use in fibrous webs that are used as filters. As used in this document, "microfiber" means fiber(s) that have an effective diameter of about 25 micrometers or less. Effective fiber diameter can be calculated using equation number 12 in Davies, C. N., *The Separation of Airborne Dust and Particles*, INST. MECH. ENGN., LONDON PROC. 1B (1952). For filtering applications, the microfibers typically have an effective fiber diameter of less than 20 micrometers, more typically, about 1 to about 10 micrometers. The fibers can be electrically-charged to enhance filtration performance—see U.S. Pat. No. 4,215,682 to Kubik et al. and U.S. Pat. Nos. 6,783,574, 6,375,886, and 6,119,691 to Angadjivand, and 6,824,718 and 6,406,657 to Eitzman et al. Electrically-charged fibers made from fibrillated films also may be used—see, for example, U.S. Pat. RE30,782, RE32,171, U.S. Pat. Nos. 3,998,916 and 4,178,157 to Van Turnout. Staple fibers may be added to improve web loft. Examples of webs that contain staple fibers are disclosed in U.S. Pat. No. 4,118,531 to Hauser. Active particulate also may be included in the electret webs for various sorbent purposes. Active particulate that has sorptive properties—such as activated carbon or alumina—may be included in the web to remove organic vapors during filtration operations. The active particulate may be present in the web at amounts of about 95 volume percent. U.S. Pat. No. 5,696,199 to Senkus et al., for example, describes various types of active particulate that may be suitable for use as a sorbent material. Examples of particle-loaded nonwoven webs are described, for example, in U.S. Pat. No. 6,234,171 to Springett et al., U.S. Pat. No. 4,429,001 to Kolpin et al., U.S. Pat. No. 4,100,324 to Anderson, and U.S. Pat. No. 3,971,373 to Braun. Alternatively, the filter element may contain one or more layers of particulate and sorptive filter media—see U.S. Pat. No. 5,656,368 to Braun et al.

Polymers that may be suitable for use in producing electret articles include thermoplastic organic nonconductive polymers. These polymers are generally capable of retaining a high quantity of trapped charge and are capable of being processed into fibers, such as through a melt-blowing apparatus or a spun-bonding apparatus. The term "organic" means that the backbone of the polymer includes carbon atoms. Preferred polymers include polyolefins, such as polypropylene, poly-4-methyl-1-pentene, blends or copolymers containing one or more of these polymers, and combinations of these polymers. Other polymers may include polyethylene, other polyolefins, polyvinylchlorides, polystyrenes, polycarbonates, polyethylene terephthalate, other polyesters, and combinations of these polymers and optionally other nonconductive polymers may be used as polymeric fiber-forming material or for producing other electret articles.

The polymeric electret articles, particularly fibers, also may be extruded or otherwise formed to have multiple polymer components—see U.S. Pat. No. 4,729,371 to Krueger and Dyrud and U.S. Pat. Nos. 4,795,668, and 4,547,420 to Krueger and Meyer. The different polymer components may be arranged concentrically or longitudinally along the length of the fiber to create, for example, a bicomponent fiber. The fibers may be arranged to form a "macroscopically homogeneous" web, namely, a web that is made from fibers that each have the same general composition.

Nonwoven polymeric electret fibrous webs for respiratory filters typically have a "basis weight" of about 2 to 500 grams per square meter ($g/m^2$), more typically about 20 to 150 $g/m^2$. The basis weight is the mass per unit area of filter web. The thickness of such nonwoven polymeric fibrous web is typically about 0.25 to 20 millimeters (mm), more preferably about 0.5 to 2 mm. Multiple layers of fibrous electret webs are commonly used in filter elements. The solidity of a fibrous electret web typically is about 1 to 25, more typically about 3 to 10.

A filter material that comprises a plurality of layers of charged, blown polyolefin microfiber (BMF) web is generally preferred, with an electrically-charged polypropylene web being more preferred.

Gaseous filters may include activated carbon granules in, for example, packed bed or bonded form. Compressive forces from a filter cartridge housing can hold the granules together in packed bed form; whereas, bonded granules are held together by adhesive or polymeric particles. Filters that include both gaseous and particulate filters may also be used.

Examples of suitable filter media are shown or discussed in the following patent documents: U.S. Pat. No. 6,743,464 to Insley et al., U.S. Pat. No. 6,627,563B1 to Huberty, U.S. Pat. No. 6,454,986 to Eitzman et al., U.S. Pat. Nos. 6,660,210, 6,409,806, and 6,397,458 to Jones et al., U.S. Pat. No. 6,406,657 to Eitzman et al, U.S. Pat. Nos. 6,391,429 and 5,952,420 to Senkus et al., U.S. Pat. No. 6,375,886 to Angadjivand et al., U.S. Pat. No. 6,214,094 to Rousseau et al., U.S. Pat. No. 6,139,308 to Berrigan et al., and U.S. Pat. No. 6,119,691 to Angadjivand et al., U.S. Pat. Nos. 5,763,078, 5,656,368, and 5,033,465 to Braun et al., and U.S. Pat. Nos. 5,496,785 and 5,344,626 to Abler.

Figure 4:
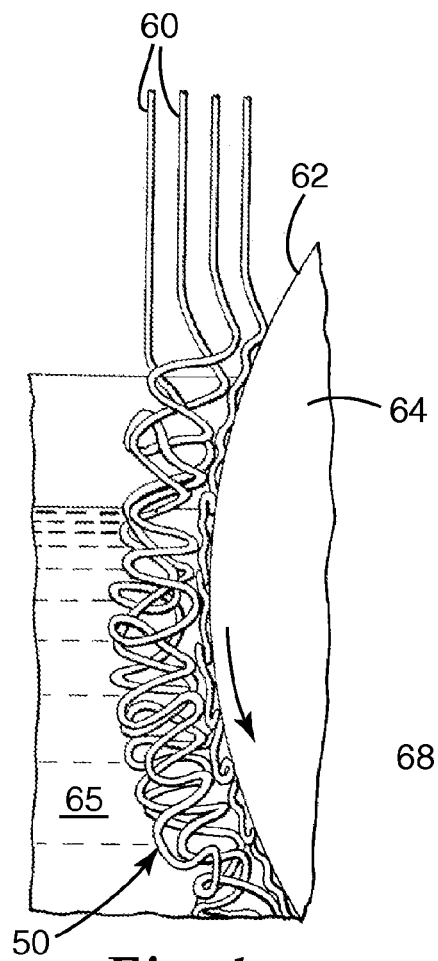
FIG. 4 illustrates a method of making a web 50 that is suitable for use in creating a plenum in accordance with the present invention.

FIG. 4 shows how a nonwoven web 50 of filaments 60 can be manufactured to provide a plenum suitable for use in connection with the present invention. In making the material that comprises the plenum 38 (FIGS. 1 and 2), liquid fused polymer may be extruded from a series of perforated nozzles or from a spinneret head. The polymer may be extruded as individual streams or filaments 60 that fall freely for a short distance before contacting an outer surface 62 of the drum 64. The drum 64 rotates at a predetermined surface speed that is substantially lower than the rate of lineal filament movement. The filaments oscillate, and the resulting waving motion establishes an irregular periodic point contact between the hot, coherent streams, causing spot welding of the filaments at points of filament intersection. As the drum 64 rotates counter-clockwise, the filaments 60 can be passed into a quench bath 65 where they cool and rigidify. This sets up a degree of resistance to the flow of the extruded streams that are caused to oscillate just above the bath surface. When the non-woven web of filaments is formed, the pores or passageways may be "non-isotropic"—that is, they do not exhibit orientation that directs the fluid preferentially in any particular direction. The filaments may, however, exhibit some directionality or grain, but this does not result in causing fluid to flow in a certain, or noticeable, directional manner. These filaments also can be "autogenously bonded", which means they bond to themselves without use of an additional part or agent such as an adhesive. The bonds can be, for example, self-generated during the manufacturing process. The filaments also may include multicomponent polymer types. For example, the filaments can be bicomponent filaments that have a sheath/core construction. The filaments can be tack-bonded or fused together. The filaments are not cut and are arranged in a nonwoven fashion such that the web can be handled by itself as a matt. Examples of thermoplastic polymers that can be used to form the components of the filaments of this invention include polymers selected from the following classes: polyolefins, such as polyethylenes, polypropylenes, polybutylenes, blends of two or more of such polyolefins, and copolymers of ethylene and/or propylene with one another and/or with small amounts of copolymerizable, higher, alpha olefins, such as pentene, methylpentene, hexene, or octene; halogenated polyolefins, such as chlorinated polyethylene, poly(vinylidene fluoride), poly(vinylidene chloride), and plasticized poly(vinyl chloride); copolyester-ether elastomers of cyclohexane dimethanol, tetramethylene glycol, and terephthalic acid; copolyester elastomers such as block copolymers of polybutylene terephthalate and long chain polyester glycols; polyethers, such as polyphenyleneoxide; polyamides, such as poly(hexamethylene adipamide), e.g., nylon 6 and nylon 6,6; nylon elastomers such as nylon 11, nylon 12, nylon 6,10 and polyether block polyamides; polyurethanes; copolymers of ethylene, or ethylene and propylene, with (meth)acrylic acid or with esters of lower alkanols and ethylenically-unsaturated carboxylic acids, such as copolymers of ethylene with (meth)acrylic acid, vinyl acetate, methyl acrylate, or ethyl acrylate; ionomers, such as ethylene-methacrylic acid copolymer stabilized with zinc, lithium, or sodium counterions; acrylonitrile polymers, such as acrylonitrile-butadiene-styrene copolymers; acrylic copolymers; chemically-modified polyolefins, such as maleic anhydride- or acrylic acid-grafted homo- or co-polymers of olefins and blends of two or more of such polymers, such as blends of polyethylene and poly(methyl acrylate), blends of ethylene-vinyl acetate copolymer and ethylene-methyl acrylate; blends of polyethylene and/or polypropylene with poly (vinyl acetate); and blends of thermoplastic elastomers such as styrene-ethylene-butylene-styrene block copolymers blended with ethylene vinyl acetate copolymer, ethyl methacrylate copolymers (optionally blended with a counterion such as zinc), ethylene propylene vinyl acetate terpolymer or ethylene-propylene copolymer. The foregoing polymers are normally solid, generally high molecular weight, and melt-extrudable such that they can be heated to form molten viscous liquids that can be pumped as streams to the extrusion die assembly and readily extruded therefrom under pressure. U.S. Pat. No. 3,686,049 to Manner et al., U.S. Pat. No. 3,687,759 to Werner et al., U.S. Pat. No. 3,691,004 to Werner et al., U.S. Pat. No. 3,837,988 to Hennen et al., U.S. Pat. No. 4,252,590 to Rasen et al., U.S. Pat. No. 4,351,683 to Kusilek, U.S. Pat. No. 4,634,485 to Welygen et al., U.S. Pat. No. 4,859,516 to Yamanaka et al., U.S. Pat. No. 4,913,757 to Yamanaka et al., and U.S. Pat. No. 5,733,825 to Martin et al., disclose materials and methods of making nonwoven filamentary webs that may be suitable for use as a plenum in connection with the present invention.

Figure 5:
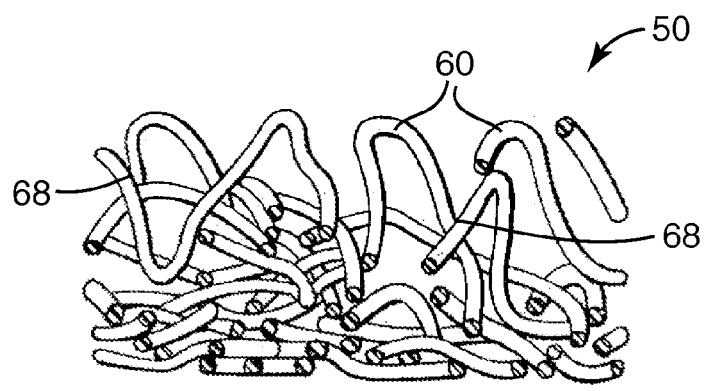
FIG. 5 illustrates a cross-section of a nonwoven web 50 of filaments 60 suitable for use as a plenum in accordance with the present invention.

As shown in FIG. 5, the plenum may comprise filaments 60 that are bonded to each other at points of filament intersection 68. In bonded form, the fibers may be, for example, visibly welded together where the filaments contact each other, they may be tack bonded, or they may exhibit point contact of a slightly fused nature. When welded together, the web—when pulled on from opposing sides with sufficient force—will not unravel from welds being broken but instead will tear the filaments. That is, the bonds are generally stronger than the filaments. When the tack bonded or slightly fused, however, the bonds will break and the web will unravel from such a pulling force. The nonwoven web 50 of filaments 60 is resistant to compaction and has extraordinary porosity. Not all points of contact may have welded or fused filaments. The porosity may be defined using the solidity parameter. The webs suitable for use as a plenum may exhibit a compression modulus of at least about 1.9 to about 220 kilopascals (kPa), preferably at least about 2.8 to about 185 kPa, more preferably at least about 3.8 to about 145 kPa. When used in a filter element for a respirator, the filaments that are used in the plenum may have a cross sectional diameter of about 0.2 to 25 mm, preferably about 0.4 to 20 mm, more preferably about 0.6 to 15 mm. The basis weight of the plenum webs may be about 0.4 to 6.5 kilograms per square meter ($kg/m^2$), typically about 0.5 to 5.2 $kg/m^2$. The solidity of the webs used in the plenum may be about 3 to 30%, more preferably about 5 to 24%. When tested according to the Compression Flow Bench Test described below, the plenum webs preferably exhibit a pressure drop ΔP of less than 0.34 kPa, preferably less than 0.24 kPa, and more preferably less than 0.17 kPa when tested under Condition A (no compression). When tested according to the Compression Flow Bench Test described below, the plenum webs preferably exhibit a through pressure drop ΔP of less than 0.35 kPa, preferably less than 0.24 kPa, and more preferably less than 0.18 kPa when tested under Condition B (normal compression). When tested according to the Compression Flow Bench Test described below, the plenum webs preferably exhibit a through pressure drop ΔP of less than 0.35 kPa, preferably less than 0.25 kPa, and more preferably less than 0.17 kPa when tested under Condition C (bending compression). The inventive filter element may not exhibit an increase in pressure drop of greater than 10%, preferably not greater than 5% when tested according to the Compression Flow Bench Test under Conditions B or C and compared to Conditions A.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

Test Methods

Web Compression Modulus

Compression modulus for a web, the ratio of stress to strain in compression, was determined by the procedures described in ASTM D 1621-04a, Standard Test Method for Compressive Properties Of Rigid Cellular Plastics, with the exception that the height of the sample ranged between 9 to 13 mm. The strain was determined when the sample was compressed 4 mm.

Web Solidity

Web solidity was determined by dividing the bulk density of a web by the density of the materials making up the web. Bulk density is the basis weight of a web (ratio of web weight to its surface area) divided by its thickness. Bulk density of a web was determined by measuring the weight and thickness of a known area of web. Thickness of the web was determined by placing a web sample on a flat horizontal support and then placing a plate onto the sample, thickness was measuring as the distance between the support and the bottom of the plate. Dividing the web sample weight by the area of the sample gives the basis weight (BW) of the specimen, which is reported in $g/cm^2$. The bulk density was determined by dividing the web basis weight by its thickness and was reported in grams per cubic centimeter ($g/cm^3$). Web solidity was determined by dividing the bulk density of the web by the density of the material from which the web was produced. The density of the polymer or polymer components can be measured by standard means if the supplier does not specify material density. Solidity (S) is reported as a dimensionless fraction of the percent solids content of a given specimen and is calculated as follows:

$$S = \frac{\rho_{web}}{\rho_{material}} \times 100\%$$

General Filter Element Making Procedure

Filters elements that use plenum webs of the invention, or, comparative materials, were produced in a cutting, lamination and ultrasonic welding process generally described in U.S. Pat. No. RE35,062E. Filter elements 12, shown generally in FIG. 2, were assembled by cutting the appropriate shaped outline from materials that form the front wall 16, rear wall 16, plenum 38, and any cover layers 34, 36 specified in the Examples below. A hole, approximately 3.2 centimeters in diameter, was cut through the rear wall of the filter element. A cylindrical polypropylene breather tube that had a 3.3 centimeter (cm) outer diameter, a 2.1 cm inner diameter with a 0.5 cm wide flange around the outer diameter was passed through the rear wall as is shown in FIG. 1. The unflanged end of the breather tube was inserted through the hole in the rear wall and was pulled through the hole until one surface of the flange contacted the interior surface of the rear wall. This flange surface was then bonded to the rear wall of the filter element using an ultrasonic welder that had a horn that fit over the breather tube and cooperating anvil. The aluminum horn had an annular shape with inside diameter of 3.18 cm and an outside diameter of 4.45 cm. The depth of the annular part of the horn was 3.81 cm, and it had an overall length of 12.7 cm. The aluminum anvil had the same inside and outside diameter as the annular part of the horn and was placed under the breather tube. The ultrasonic generator and components were manufactured by Branson Ultrasonic Corporation, Applied Technologies Group, Danbury, Conn. The welding assembly included a Branson 501 actuator, 502 converter, and standard 2 to 1 booster. The horn welding pressure was 551 kPa for a weld duration of 1.0 second and hold time of 2.0 seconds. After attachment of the breather tube to the rear wall, the various layers were assembled in a sandwich-like structure where the plenum component was the innermost layer surrounded by the front and rear walls, including any cover layers. In the final step of making the filter element peripheral edges of the front and rear walls and plenum component were ultrasonically welded together. Welding was done using an aluminum horn that had a flat welding surface resembling FIG. 6. The dimension for the overall width α and height β of the horn was 116 and 85 millimeters (mm) respectively. The horn perimeter edge had multiple radii connected by straight edges. Referring to FIG. 5, and rotating clockwise from the centerline 70, the perimeter edge consisted of radius 80*b*, straight 81*b*, radius 82*b*, straight 83*b*, radius 84*b*, straight 85, radius 84*a*, straight 83*a*, radius 82*a*, straight 81*a*, and radius 80*a*. Radial dimensions of 80*a*, 80*b*, 82*a*, 82*b*, 84*a* and 84*b* were based on circles of radii 35, 35, 25, 25, 31, and 31 mm respectively. Each straight-line segment in the drawing denotes a termination of one radii and the initiation of another. Dimensions of the straight sections $\gamma_1$, $\gamma_2$, $\delta_1$, $\delta_2$, and $\epsilon$ were 43, 43, 4, 4, and 58 mm respectively. The angle $A_2$, formed between the centerline 70 and straight 81*b* was 49.5 degrees, as was the angle $A_1$ formed between the centerline 70 and straight 81*a*. The welding horn shaft 72 was centered a distance Δ, 35 mm below the top of the horn. Around the perimeter of the horn, a welding lip 71, 2.38 mm wide and 6.35 mm tall, protruded from the welding surface. The equipment used to weld the breather tube was employed to weld the outer edge of the filter element but with separately specified welding parameters. To weld the filter element, the horn pressure during welding was 620 kPa with weld duration of 1.0 second and hold time of 0.8 seconds.

Compression Flow Bench Test

Filters produced by the General Filter Element Making Procedure were evaluated using a flow bench test. Filters were tested under one of three compression conditions: (A) no compression, (B) compression loading normal to the face of the filter, and (C) curvature compression loading. Under normal loading compression, Condition 2, the weight of a flat perforated metal plate was used to compress the filter during testing. For curvature compression loading, Condition 3, the filter was force-loaded and caused to curve in an arch during filter testing. The flow bench tester, used to induce airflow through the filter and monitor the resulting pressure drop, was employed for all three compression condition tests.

Figure 7:
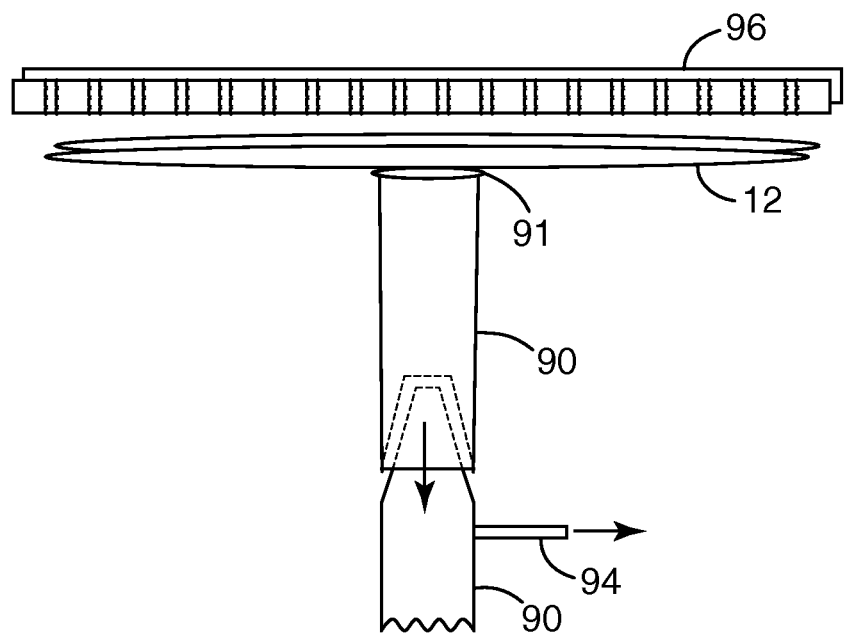
FIG. 7 is a side view of an apparatus for testing a filter element for air flow resistance under compressed conditions.
Figure 8:
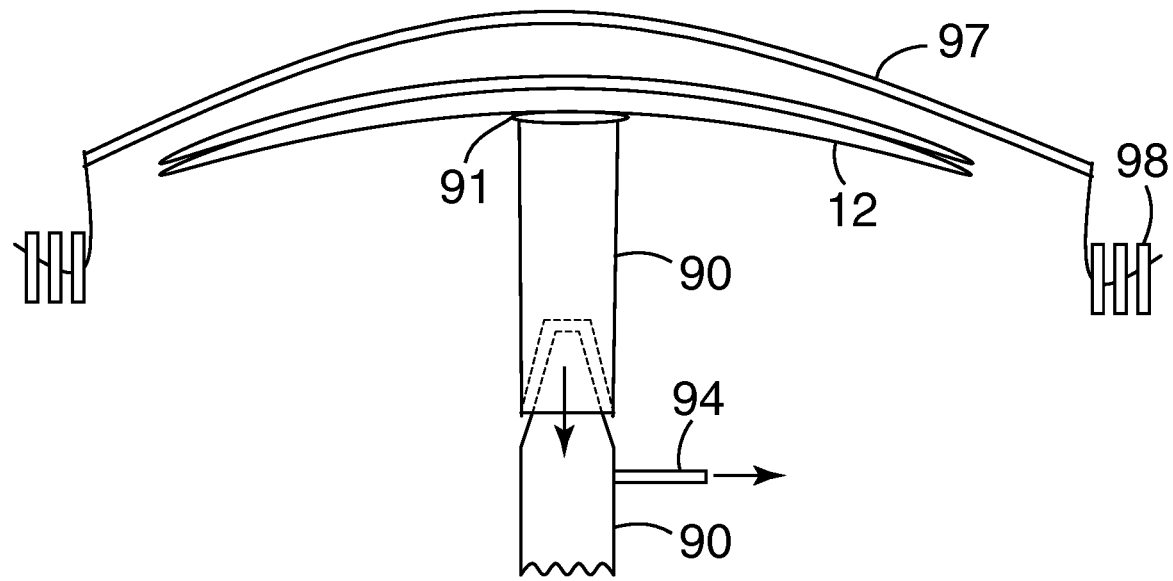
FIG. 8 is a side view of an apparatus for flow testing of a filter element.

The flow bench tester, as represented in FIGS. 7 and 8, consisted of a vertically oriented, 2.1 cm inner diameter, stainless steel flowtube 90 that had an attachment means 91 on top of the tube for affixing a filter element 12, a pressure monitoring port 94, in-line flow meter, and vacuum pump. The pressure monitoring port was located 6.5 mm below the filter on the flow tube and was used to monitor vacuum below the filter during testing. The flow meter was located in-line with the flowtube 90 and monitored the volume of air drawn through the filter 12. Volumetric airflow was maintained at a constant rate of 85 liters per minute. A vacuum pump, connected to the outlet of the flowtube 90, drew air through the attached filter 12. Using this flow bench test configuration, filter element samples were tested under the three compression conditions, and the pressure drop of the filter element was recorded. Pressure drop of a test filter was defined as the difference between the ambient pressure on the inlet of the filter the pressure monitored at the flow tube port and is reported in kPa.

Figure 6:
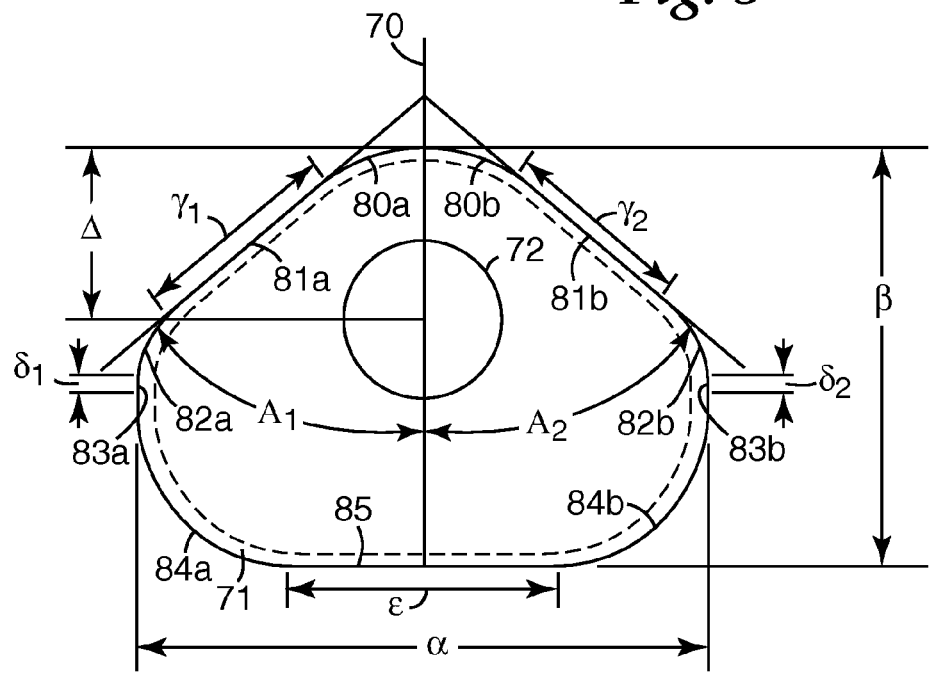
FIG. 6 is a side view of a welding horn used for making a filter element in accordance with the present invention.

Filter elements were tested under loading Condition B by first fixing the test filter, by the breather tube, to the flowtube 90 of the flow bench tester. A rectangular perforated plate 96 was placed on top of the inlet face of the filter element 12, as shown in FIG. 6, and the flow test was conducted. The perforated plate was made of 304 stainless steel and had a thickness of 3.048 millimeter (mm) with 6.35 mm diameter holes having center-to-center spacing of 9.525 mm resulting in an open area of 40%. The perforated plate also was 30.48 cm×20.32 in size and weighed 787 g. The plate was centered on the face of the filter and the resulting compression load to the filter was 547 Pa.

Filters tested under loading Condition C were fixed to the flowtube 90 of the flow bench tester as in the loading Condition B. An edge-weighted flexible perforated netting 97 was placed on top of the inlet face of the filter as shown in FIG. 7, and the flow test was conducted. Use of the edge-weighted netting in this fashion caused the filter to curve and applied compression, simulating a compression and deformation of the filter as might occur in use with a respirator. The netting used was a polyethylene, 3.1×3.6 mm pore size, 2.1 mm thick Naltex® Extruded Netting type 13796 available from Delstar Technologies, Inc., 601 Industrial Drive, Middletown, Del. During filter testing a 16.15 cm×5.08 cm section of netting was draped over the face of the filter 12, with the long dimension of the netting oriented with the long dimension of the filter. With the netting centered on the face of the filter, 150 gram weights 98 were attached to the long end of the netting 97. Loading and placement of the netting in this way caused the filter to bend in the direction of the loads.

To evaluate a filter configuration using flow bench testing, nine specimens of the same configuration were tested and the results were reported as an average of the nine tests.

EXAMPLES

Example 1

A plenum web of the invention was produced by the method generally described in U.S. Pat. No. 5,733,825. The plenum web was polyester, 3M type 4430-6x20, Spacer Web available from 3M Company, St. Paul, Minn. The plenum web was configured with filter media and formed into a filter as described in the General Filter Element Making Procedure above. The front and rear faces of the filter element were filter media manufactured by Hollingsworth & Vose Co., Walpole, Mass. Grade TR0612J2. This material had a cover web which was oriented to the outside of the filter element. Filter elements constructed as described were evaluated for lateral air flow properties while under compressive loading as prescribe in the Compression Flow Bench Test procedure. Results are given in Table 1.

Comparative Example 1

A filter was made as described in Example 1 with the exception that a bonded nonwoven web was use as the plenum material. The nonwoven web was a dry-laid web that had a basis weight of 106 g/m$^2$, thickness of 8 mm and solidity of 1% and was composed of a blend of staple fibers that were thermally bonded together. The plenum web was prepared by carding blends of polyester (PET) staple fiber 15 denier, 32 mm cut length, Type 295, manufactured by Kosa, Charlotte, N.C., 4 denier, 51 mm cut length, Type 254, also manufactured by Kosa, Charlotte, N.C., in a 70:30 PET/binder fiber weight ratio and subsequently placing the carded web in a circulating air oven at 163 degree C. for about 1 minute to activate the binder fibers and consolidate the web. Filter elements constructed as described were evaluated for lateral air flow properties while under compressive loading as prescribe in the Compression Flow Bench Test procedure. Results are given in Table 1.

TABLE 1

| | Condition | | |
|---|---|---|---|
| | A | B | C |
| | Pressure Drop (kPa) | | |
| Condition Example 1 | | | |
| Sample 1 | 15.4 | 16.5 | 14.8 |
| Sample 2 | 14.8 | 16.2 | 14.5 |
| Sample 3 | 15.6 | 16.8 | 15.3 |
| Sample 4 | 16.1 | 17.0 | 14.9 |
| Sample 5 | 15.1 | 16.4 | 14.9 |
| Sample 6 | 16.3 | 17.9 | 15.1 |
| Sample 7 | 14.6 | 16.1 | 14.8 |
| Sample 8 | 16.4 | 17.4 | 15.5 |
| Sample 9 | 14.6 | 15.9 | 14.4 |
| Average | 15.4 | 16.7 | 14.9 |
| Standard Deviation | 0.7 | 0.6 | 0.3 |
| Comparative Example 1 | | | |
| Sample 1 | 48.4 | 208.0 | 76.1 |
| Sample 2 | 51.0 | 183.0 | 90.0 |
| Sample 3 | 36.0 | 179.0 | 59.8 |
| Sample 4 | 40.5 | 182.0 | 64.7 |
| Sample 5 | 39.7 | 146.0 | 60.9 |
| Sample 6 | 55.8 | 229.0 | 94.2 |
| Sample 7 | 40.0 | 184.0 | 69.1 |
| Sample 8 | 35.0 | 119.0 | 54.8 |
| Sample 9 | 63.0 | 234.0 | 94.0 |
| Average | 45.5 | 184.9 | 73.7 |
| Standard Deviation | 9.1 | 34.6 | 14.6 |

As the data show, filters using plenum materials of the invention have significantly lower pressure drop, for both compression conditions, when compared to a similarly prepared filter using known fiber-based plenums. The Comparative Example filter construction using fiber-based plenum materials suffered significant loss of air flow capacity, indicative of a greater pressure drop, when placed under normally applied or curvature compression. Variability between test samples was also less for the filters that employed the inventive plenum material as compared to filters using know fiber-based plenum materials. Filter elements of the invention do not exhibit substantial increase in pressure drop when tested under compressed conditions.

This invention may take on various modifications and alterations without departing from its spirit and scope. Accordingly, this invention is not limited to the above-described but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A filter element that comprises:
    (a) a fluid inlet;
    (b) a fluid outlet in fluid communication with the inlet;
    (c) a filter media through which a fluid passes when moving from the inlet to the outlet; and
    (d) a plenum that comprises continuous filaments that have a cross sectional diameter of about 0.2 to 25 mm and that are welded to each other at points of filament intersection, wherein the plenum is curved when viewed from the side in cross-section, and further wherein the continuous filaments are not multicomponent filaments;
    wherein the plenum exhibits a compression modulus of at least about 1.9 to about 220 kPa.

2. The filter element of claim 1, wherein the plenum exhibits a compression modulus of at least about 2.8 to about 185 kPa.

3. The filter element of claim 1, wherein the plenum exhibits a compression modulus of at least about 3.8 to about 145 kPa.

4. The filter element of claim 1, wherein the filter element has non-rigid sidewalls.

5. The filter element of claim 4, wherein the filter element includes first and second layers of filter media and has the plenum disposed therebetween.

6. The filter element of claim 1, wherein the filter element is mechanically configured for attachment to a mask body of a respirator, and wherein the filter element is curved from a first point on its periphery to a second point, and wherein the fluid inlet includes front and rear fluid-permeable walls.

7. The filter element of claim 6, wherein the front and rear walls comprise first and second fibrous cover webs.

8. The filter element of claim 6, wherein the filter element is curved to coincide with an outer curvature on the mask body.

9. The filter element of claim 1, being integrally disposed in the mask body of a respirator.

10. The filter element of claim 1, wherein the filter media comprises meltblown microfibers that are electrically charged.

11. The filter element of claim 1, wherein the filaments in the plenum comprise polypropylene, polyethylene, or blends thereof.

12. The filter element of claim 1, wherein the filaments are tack bonded or slightly fused at points of filament intersection.

13. The filter element of claim 1, wherein the filter element does not exhibit a substantial increase in pressure drop when tested under compressed conditions.

14. The filter element of claim 1, wherein the filaments have a cross-sectional diameter of about 0.4 to 20 millimeters, and wherein the basis weight of the plenum is about 0.4 to 6.5 kilograms per square meter.

15. The filter element of claim 1, wherein the filaments have a cross-sectional diameter of about 0.6 to 15 millimeters, and wherein the basis weight of the plenum is about 0.5 to 5.2 kilograms per square meter.

16. The filter element of claim 1, wherein the plenum exhibits a solidity of about 3 to 30 percent.

17. The filter element of claim 1, wherein the plenum exhibits a solidity of about 5 to 24 percent.

18. The filter element of claim 1, which does not exhibit an increase of pressure drop of greater than 10% when tested according to the compression flow bench test under Conditions B or C in comparison to Condition A.

19. The filter element of claim 1, which does not exhibit an increase of pressure drop of greater than 5% when tested according to the compression flow bench test under Conditions B or C in comparison to Condition A.

20. A respirator that comprises the filter element of claim 1.

21. The filter element of claim 1, wherein the continuous filaments are welded to each other at irregular periodic points of contact.

22. A method of making a filter element, which method comprises:
    placing a plenum that comprises continuous filaments that have a cross sectional diameter of about 0.2 to 25 mm and that are welded to each other at points of filament intersection in a juxtaposed relationship to at least one layer of filter media, wherein the plenum is curved when viewed from the side in cross-section, wherein the continuous filaments are not multicomponent filaments, and further wherein the plenum exhibits a compression modulus of at least about 1.9 to about 220 kPa; and
    providing a fluid inlet and a fluid outlet to allow air that passes therebetween to be distributed by the plenum and pass through the filter media.

23. A method of making a respirator, which method comprises:
    providing a filter element according to the method of claim 22; and
    attaching the filter element to a mask body.

24. A filter element that comprises:
    (a) a fluid inlet;
    (b) a fluid outlet in fluid communication with the inlet;
    (c) a filter media through which a fluid passes when moving from the inlet to the outlet; and
    (d) a plenum that comprises continuous filaments that have a cross-sectional diameter of 0.2 to 25 millimeters and that are autogenously welded to each other at irregular points of filament intersection such that the plenum exhibits a compression modulus of 1.9 to 220 kPa, wherein the plenum is curved when viewed from the side in cross-section, and further wherein the continuous filaments are not multicomponent filaments.

* * * * *